INVENTOR
Peter GUNSSER
By his ATTORNEY

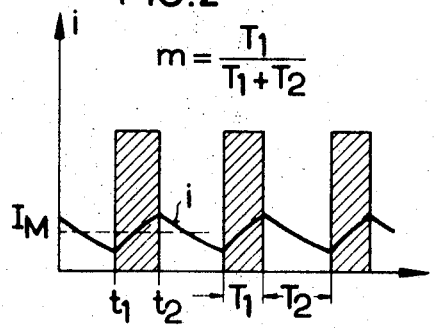
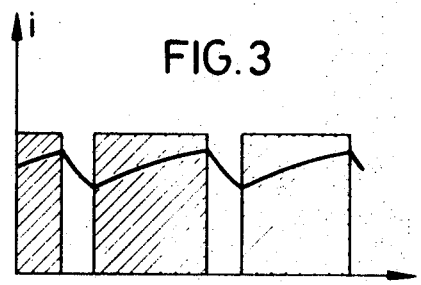
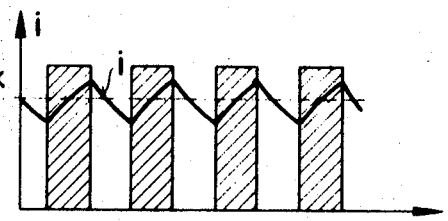
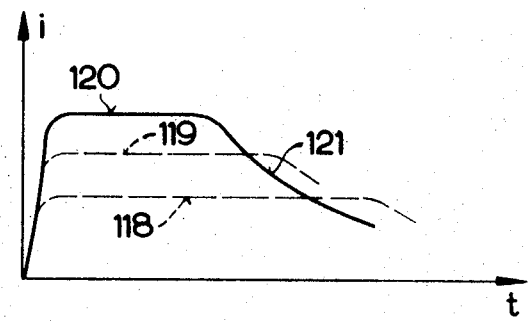
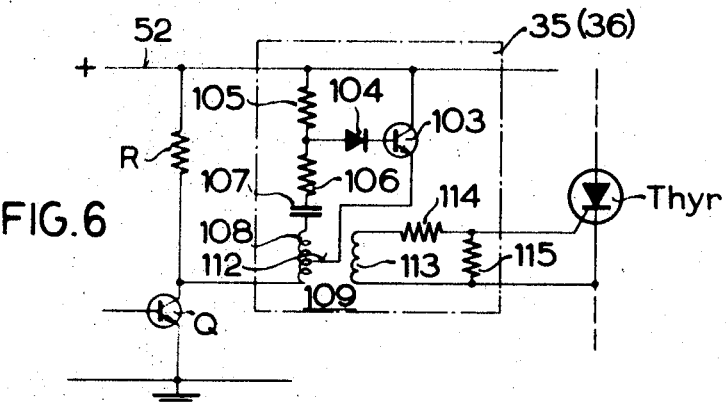

INVENTOR
Peter GUNSSER

United States Patent Office 3,517,290
Patented June 23, 1970

3,517,290
THYRISTOR CONTROL CIRCUIT WITH FULL LOAD CURRENT BY-PASS, PARTICULARLY FOR ELECTRICAL VEHICLES
Peter Gunsser, Stuttgart, Germany, assignor to Robert Bosch G.m.b.H., Stuttgart, Germany, a limited-liability company of Germany
Filed Dec. 12, 1967, Ser. No. 689,896
Claims priority, application Germany, Dec. 21, 1966, B 90,401
Int. Cl. H02p 5/16
U.S. Cl. 318—332       17 Claims

ABSTRACT OF THE DISCLOSURE

The power circuit of a motor is supplied intermittently with power through a thyristor, such as an SCR, which is shunted by relay contacts when the thyristor is controlled to be ON continuously; to control the relay for the shunting contacts, an integrating network is provided supplying a control output potential; a voltage sensitive semiconductor switching circuit is responsive to the control output potential to operate the shunt relay in accordance with predetermined signal transfer functions.

---

The present invention relates to a thyristor control system, and more particularly to a control system for electric motors, such as direct current motors which drive electrical vehicles, such as small tractors, fork lift trucks and the like but may be used for any electrical drive.

Current to the motor is controlled by the thyristor, which can preferably be a silicon controlled rectifier (SCR) which provides intermittent current pulses to the motor. Upon high loading of the motor, these pulses will become long so that, in effect, a continuous current will flow through the motor. Under such conditions it is desirable to shunt the SCR by a switch, controlled by a relay.

The relay operating the shunting contacts must be controlled in such a manner that the contacts close only when the SCR is continuously conductive for a predetermined time duration. Difficulties have been experienced in controlling the operation of the relay.

It is an object of the present invention to provide a control arrangement for positive control of the shunting relay, which is effective and reliable and which is automatically responsive to various driving conditions encountered by the vehicle driven by the motor.

SUBJECT MATTER OF THE PRESENT INVENTION

Briefly, in accordance with the present invention, a switching circuit is provided controlling the ON-OFF time of the thyristor; an integrating circuit is connected to the output of the switching circuit to integrate the output thereof and supply a control output signal representative of time during which the thyristor is controlled by the switching circuit to be ON. The relay control circuit is responsive to this output control signal, to operate the relay when the control signal reaches a predetermined value.

Preferably, the switching circuit is a switching amplifier, sensitive to an input representative of difference between a commanded value, controlled by an operator, and a sensed value sensing current through the motor.

The internal resistance of the thyristor and of shunting contacts is different. Preferably, the circuit thus further includes an automatic compensation arrangement to change the signal representative of average motor current to compensate for differences in potential drop across the SCR with respect to the shunting contacts. When the shunting contacts close, parallel relay contacts are provided to place a resistance in circuit with the sensing signal circuit, so that the ratio of command signal to actual sensed signal remains the same and thus the input potential to the control circuit for the SCR does not change with shunting of the thyristor itself. This feature increases the stability of the entire control network.

In accordance with another feature of the invention, operator-controlled switch means are provided which control the relay to shunt the SCR, independently of the control provided by the error signal itself. This operator-controlled switching means is preferably automatically engaged at a predetermined position of the controller, for example at maximum power position. This feature is particularly desirable if, for example, after starting the vehicle has to ascend a grade, or, for example, go over a sill. Current in the motor, that is the sensed value, increases; in order to limit the current through the thyristor, then, the shunting contacts would be opened, since the current sensing network is insensitive to the position of the relay contacts. This would be undesirable since the motor would not have full starting power available. The feature of the invention enables utilization of full power under all conditions.

According to a further feature of the invention, a second integrating network is provided, the output potential of which is applied to the switching network. The second integrating network is sensitive to predetermined switching rates of the switching network, for example rapid on-off switching, to additionally control the shunting relay to remain closed. This arrangement enables application of high current to the motor, for example when the vehicle has to start from a dip, that is start and ascend. The regulating network automatically limits the current in the motor, to prevent damage to the SCR, and thus the situation could arise that the vehicle could not start at all, since the SCR would rapidly switch maximum current ON and OFF, for example at the rate of several hundred times per second. The switching frequency is sensed and used as an electrical control quantity; when it exceeds a certain value, that is when the switching frequency is high, the shunting relay is controlled to close, enabling starting with full power. After the vehicle has reached speed, current in the motor will decrease, enabling opening of the shunting contacts and control of motor current by the SCR.

The structure, organization, and operation of the invention will now be described more specifically with reference to the accompanying drawings, wherein:

FIGS. 2, 3, 4 and 5 are diagrams of average current with respect to time through the motor;

FIG. 6 is a schematic diagram of a thyristor firing circuit; and

Figure 1:
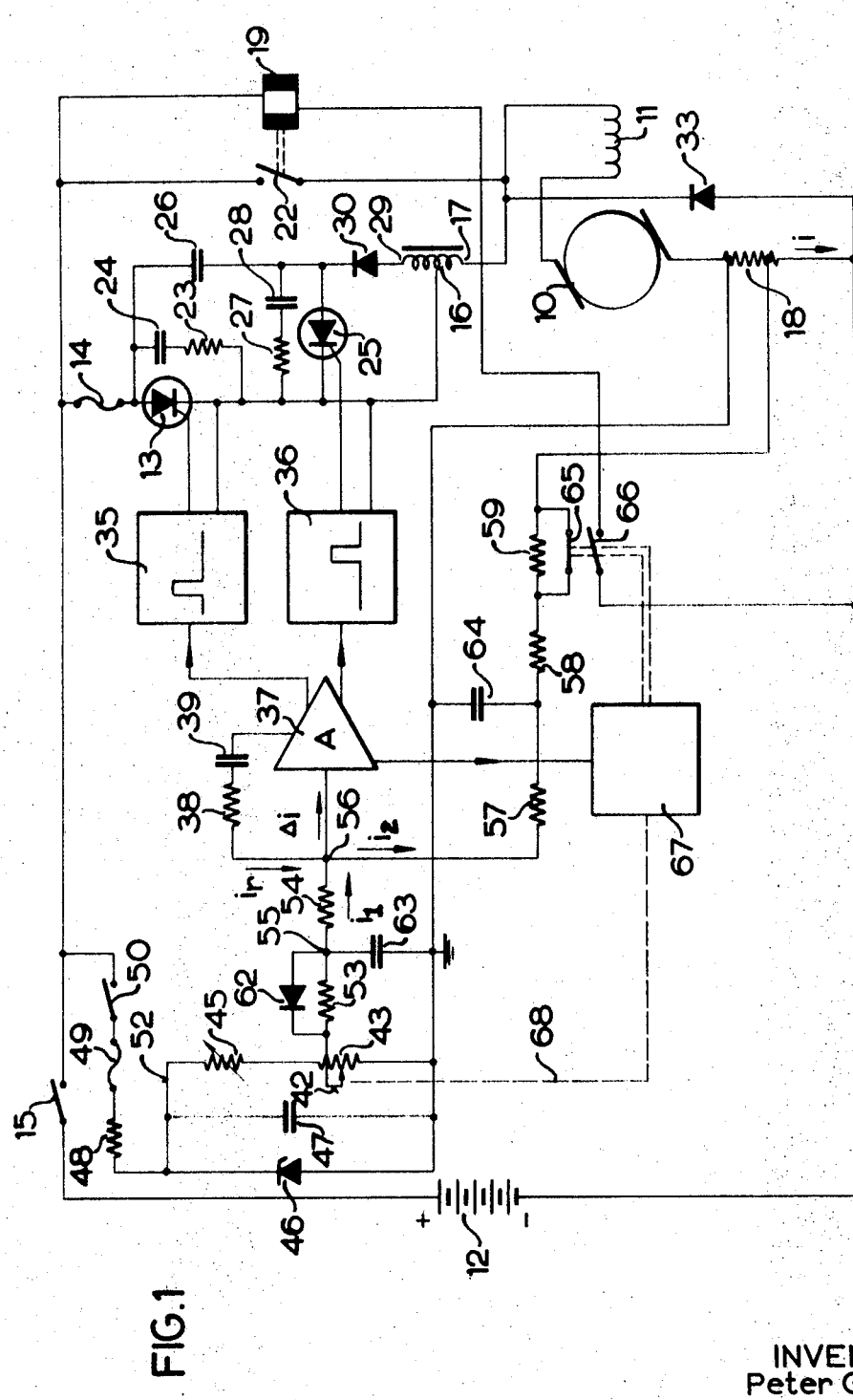
FIG. 1 is a block diagram of the circuit in accordance with the present invention.

Referring now to the drawings, where like elements are indicated by like reference numerals, and particularly to FIG. 1: a series D-C motor 10 has a field winding 11. A battery 12 supplies current to the motor 10 over a power thyristor 13, such as a silicon controlled rectifier. Rather than using a thyratron-like device, it is also, of course, possible to use a grid controlled switch in the circuit according to the present invention.

The anode of thyristor 13 is connected to the positive terminal of battery 12 over a main switch 15 and a fuse 14. The center tap of a tapped transformer 16 is connected to the cathode of thyristor 13, the end 17 of the winding of transformer 16 is connected to one end of field 11. The other end of field 11 is connected to the armature of motor 10. The other terminal of the armature is connected over a measuring resistance 18 to the negative terminal of battery 12.

The thyristor 13 is shunted by a pair of contacts 22, operated by a shunting relay or breaker 19. One terminal of contacts 22 is again connected to winding terminal 17 of transformer 16, and the other contact is connected to the main switch 15. When contacts 22 are closed, that is when relay 19 is operated, it is seen that the main power path of thyristor 13 is shunted.

A series circuit formed of a resistance 23 and condenser 24 is in parallel to thyristor 13. In order to extinguish the thyristor 13, that is, in order to interrupt conduction of thyristor 13, a second thyristor 25 is provided, the cathode of which is connected to the cathode of thyristor 13, and the anode of which connects to a condenser 26 having a high value, such as several hundred microfarads. The other terminal of condenser 26 is connected to the anode of thyristor 13. A series circuit comprising a resistance 27 and condenser 28 is in parallel with thyristor 25.

Terminal 29 of transformer 16 connects to the anode of a diode 30, the cathode of which is connected to the anode of thyristor 25.

The anode of a diode 33 connects to the negative terminal of battery 12. The cathode of diode 33 connects to the terminal 17 of the transformer 16. Diode 33 acts as a floating diode. When thyristor 13 is blocked, current $i$ of motor 10 can continue to flow through diode 33. Referring to FIG. 2, when thyristor 13 is connected at time $t_1$, the current $i$ in motor 10 rises exponentially. If thyristor 13 is switched OFF at time $t_2$, current $i$ can continue to flow through diode 33, decreasing exponentially. A certain ON-OFF ratio of thyristor 13 that is a predetermined ratio $m$ of conductive time $T_1$ and the sum of conductive and non-conductive time $(T_1+T_2)$ will cause an average current $I_M$ to flow through the D-C motor 10 or, mathematically, $$m = T_1/(T_1+T_2)$$

FIG. 2 illustrates a switching ratio (which may also be called ON-OFF ratio, or mark-to-space ratio) of about 35%, illustrating a comparatively low average current $I_{M1}$. FIG. 3 illustrates that with an ON-OFF ratio of about 80%, a higher average current $I_{M2}$ will flow.

Figure 7:
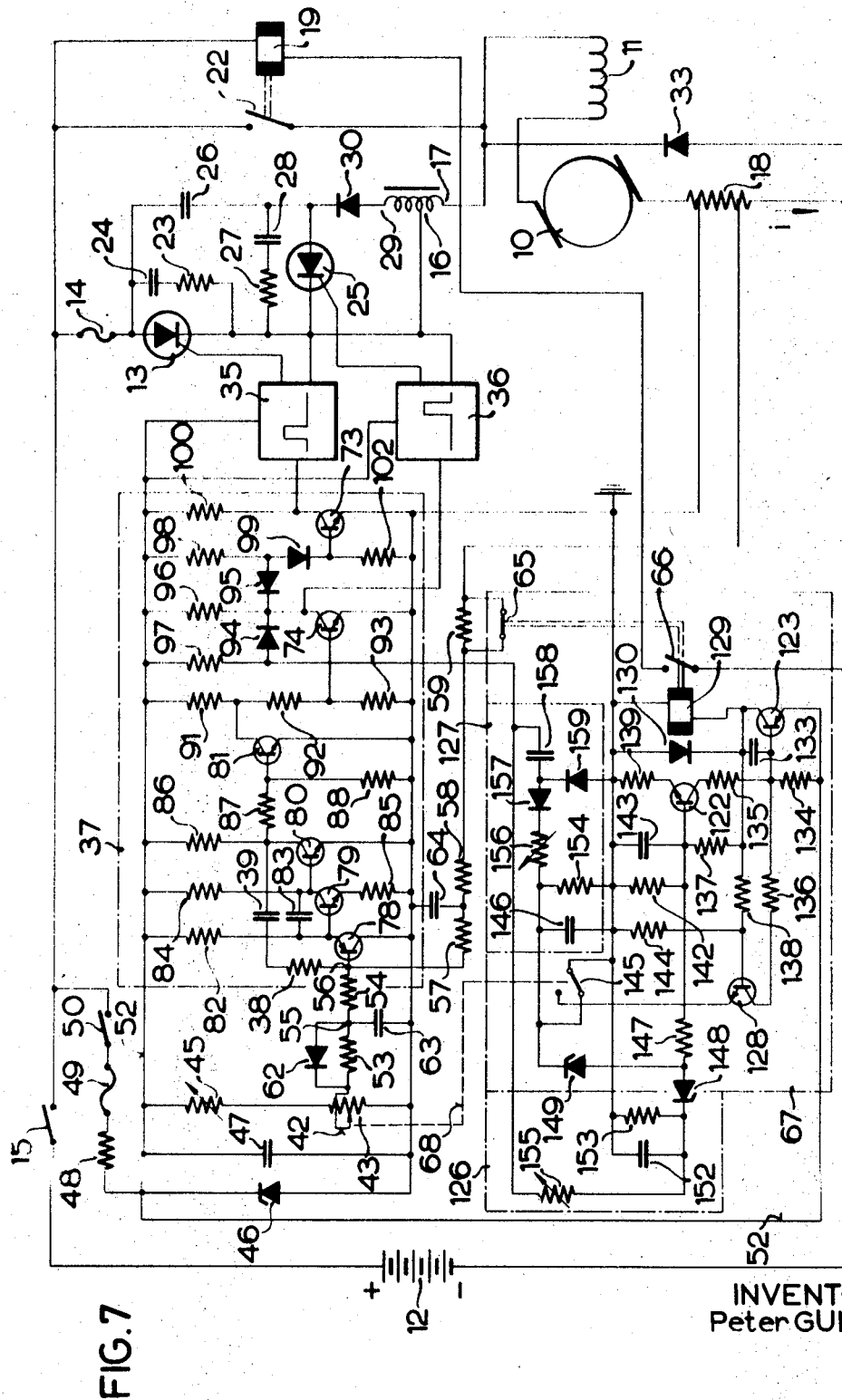
FIG. 7 is a detailed circuit diagram of the arrangement in accordance with the present invention.

Thyristor 13 is switched ON by an impulse source 35, and to cause thyristor 25 to conduct, an impulse source 36 is provided; the pulse sources are described in detail with reference to FIG. 6. Both impulse sources 35, 36 are connected to the output of a switching circuit 37. Switching circuit 37 contains a positive feedback circuit including a resistance 38 and a condenser 39, and could be characterized as a multivibrator having a switching ratio and output frequency which is dependent on the potential at its input. The complete circuit diagram of such a switching circuit is illustrated in FIG. 7, in connection with which its operation will also be described.

The command signal for the switching circuit 37 is obtained from potential appearing at a tap point 42 on a potentiometer 43. A signal representative of motor current is obtained across measuring resistance 18, which resistance 18 thus acts as a sensing device for motor current, and as a source of sensed signal. The terminal of measuring resistance 18 connected to the armature of motor 10 is further connected to ground or, in case of a vehicle, to chassis. One of the terminals of potentiometer 43 is likewise connected to chassis. This enables connection of the switching amplifier 37 to chassis or ground which, because it has a high amplification, is particularly sensitive to random noise.

The other terminal of potentiometer 43 is connected over a resistance 45, which is variable, to the cathode of a Zener diode 46. The anode of Zener diode 46 is connected to chassis. A condenser 47 is in parallel with the Zener diode 46. Resistance 45 is variable, the adjustment enabling setting of the largest permissible current $i$ through motor 10.

The cathode of Zener diode 46 is connected over a resistance 48, a fuse 49 and a switch 50 with the main switch 15. Further, it is connected to a line 52, hereinafter referred to as the positive bus. When the main switch 15, and switch 50 are closed, a current will flow over resistance 48 and Zener diode 46, the Zener diode maintaining a constant potential thereacross, and thus across resistances 45, 43.

Tap point 42 is connected over two resistances 53, 54, interconnected at a junction 55 to the input 56 of the switching amplifier 37. Input 56 is further connected over three series-connected resistances 57, 58, 59 with the ungrounded terminal of measuring resistance 18, which also connects to the negative terminal of battery 12, as seen in FIG. 1.

A diode 62 is connected in parallel to resistance 53; the anode of diode 62 is connected to junction point 55. A condenser 63 (e.g. 50 μf.) is connected between junction 63 and chassis. Together with the resistance 53 (e.g. 3K ohm) condenser 63 forms a delay circuit. If the tap point 42 is changed rapidly, so that the potential with respect to chassis increases rapidly, condenser 63 must first charge over resistance 53. The higher command value is thus applied to the input 56 only after a certain delay. If, however, tap point 42 is changed in the other direction, that is to decrease the command signal, condenser 63 can discharge immediately over diode 62. Thus, the delay in application of the command signal is effective only upon acceleration, and not upon deceleration.

A condenser 64 is connected between the junction point of resistances 57, 58 and chassis. The thus formed R-C network forms a filter which acts to smooth the undulating potential appearing across measuring resistance 18.

Contacts 65 are connected in parallel to the resistance 59. These contacts are synchronized to operate together with contacts 66, and controlled from a semiconductor switching circuit 67. Switching circuit 67 is connected to switching amplifier 37. Additionally, it is sensitive to the position of tap 42 on potentiometer 43, as will be explained in detail in connection with FIG. 7. If tap 42 is set to command full load current, a switch in unit 67 is operated, as schematically indicated in FIG. 1 by the broken line 68.

Contacts 66 are connected in series with the coil of relay 19, operating the shunting contacts 22, to connect the coil across the negative terminal of battery 12 and the main switch 15.

Operation of the circuit in accordance with FIG. 1: If a predetermined command signal is set at tap point 42 of potentiometer 43, a certain predetermined current $i_1$ will flow over resistances 53, 54. If the motor is at rest, the same current will continue to flow over resistances 57, 58, 59 to the measuring resistance 18. This causes a potential to appear at junction 56, with respect to ground, which causes an error current signal $\Delta i$, which controls the switching amplifier 37 to initiate operation. A current $i_r$ will flow over the positive feedback circuit formed of resistance 38 and condenser 39, which causes initially increase in operation of the switching amplifier 37.

As soon as switching amplifier 37 provides a pulse, pulse generator 35 will be switched ON, and provide a pulse which will cause thyristor 13 to become conductive. Current will flow in motor 10, and through field winding 11. A potential will arise across measuring resistance 18, causing a current $i_2$ to flow in resistances 57, 58, 59 to junction 56. This current, being in opposition to current $i_1$, will cause a decrease at the potential, with respect to ground, at input junction 56. Additionally, the current $i_r$, in the feedback network, will decrease since condenser 39 will discharge rapidly. Impulse generator 37 is turned off, causing pulse source 35 to be turned off and pulse source 36 to be turned on, causing conduction of thyristor 25. Condenser 26 can now discharge over thyristors 25 and 13; the cathode of thyristor 13 will, instantaneously, become more positive than its anode, blocking tyristor 13 and turning it off. No more current can thus flow from battery 12 to the field winding 11 and motor 10. Current will, however, continue to flow through the motor since diode 33 will open, as previously described. This current decreases exponentially, so that the potential across measuring resistance 18 will likewise drop, causing a higher potential between junction 56, at the input to switching amplifier 37, and ground. This again turns on the switching amplifier 37, and with it thyristor 13.

The above described cycle continues constantly. The frequency of the switching on, and switching off, and the ratio of ON-time to the sum of ON-time and OFF-time will depend on the difference, or error signal between sensed motor current across measuring resistance 18 and commanded motor current as determined by the position of the tap point 42.

If tap point 42 is set at the highest value of potentiometer 43, then the switching ratio $m$ will depend primarily upon the loading on the motor 10. If the rotor of motor 10 is blocked, so that it cannot turn, a switching ratio $m$ will be obtained which depends on the construction and the characteristics of the motor itself, primarily governed by its internal resistance, its inductivity, and its short circuit current characteristics. A typical switching ratio would be $m=50\%$.

If motor 10 is not in blocked-rotor condition, so that it may turn, then the switching ratio $m$ will increase above 50%. Since the armature of motor 10 causes, with increasing speed, an increasing counter EMF, current in motor 10 will decrease when a switching ratio of $m=100\%$ has been reached.

A switching ratiof 100% of course corresponds to continuous conduction of thyristor 13. Shortly before the switching ratio of 100% is reached, thyristor 13 will be conductive for an appreciable period of time during each switching cycle. For example:

Turn-on time of thyristor 13—10 to 50 sec.
Subsequent turn-off time—approx. 1.5 msec.

In order to prevent partial discharge of condenser 26, serving as an energy storage device, during the period of time when the thyristor is ON, the voltage-sensitive semiconductor switch 67 is provided which automatically causes closing of the shunting contacts 22 during long ON-times of the thyristor. The shunting circuit is preferably closed already when the turn-ON ratio is in the order of 90 to 95%. Switch 67 causes closing of contacts 66, which in turn controls relay 19. Contacts 65 open simultaneously, placing resistance 59 in series with the resistances 57, 58 thus, as will be apparent, increasing the potential between the input junction 56 and chassis. This has the same effect on switching amplifier 37 as if the error signal between commanded and sensed currents had been changed.

The reason for the insertion of resistance 59 in the circuit is this. The internal resistance of the thyristor 13 causes a potential drop thereacross of about 1.2 to 1.5 v. due to motor current. As soon as the shunting contacts 22 close, this potential drop through the thyristor is eliminated and the current $i$ through the motor increases, so that the difference between commanded value (on potentiometer 42) and sensed value (taken from measuring resistance 18) will change. As a result, the potential between the input junction 56 and chassis will decrease, causing turn-off of the semiconductor switch 67, and thus opening of the shunting contacts 22. Placing resistance 59 in series with the sensing signal circuit compensates for increase of the current $i$ through motor 10, that is the potential between the input junction 56 and chassis remains essentially unchanged even though the shunting contacts 22 close. As can be seen, the value of resistance 59 will have to depend on the internal resistance of thyristor 13.

Additionally, the voltage-sensitive semiconductor switch 67 has other important functions, which will be explained in connection with FIG. 7.

Referring now to FIG. 7: Parts already described in connection with FIG. 1 will not be described again, and similar parts have like reference numerals. The switching amplifier itself essentially includes three transistors, namely pnp transistor 78 and two npn transistors 79, 80. Transistor 81 is an inverter-amplifier, that is its output potential is reversed with respect to its input potential. A pair of npn transistors 73, 74 are connected thereto which control the impulse generators 35, 36.

The emitter of transistor 78, which is a highly sensitive silicon transistor, is connected over a resistance 82 (e.g. 100K ohm) to positive bus 52, which positive bus has a constant potential with respect to chassis as determined by Zener diode 46. The emitter of transistor 78 is connected directly to the base of transistor 79 and over a condenser 83 (e.g. 15 nf) with the collector of transistor 79.

The collector of transistor 78 is connected directly to chassis. Its base is connected over a series circuit formed of resistance 38 (e.g. 3K ohm) and a condenser 39 (e.g. 70 nf) with the collector of transistor 80. Further, input junction 56 is connected to the base of transistor 78, which is further connected to the resistance network formed of resistances 53, 54 and 57, 58, 59 as previously described in connection with FIG. 1.

The collector of transistor 79 is connected directly to the base of transistor 80, and over a resistance 84 with positive bus 52. The emitter of transistor 79 is connected over a resistance 85 to chassis. The emitter of transistor 80 likewise connects to chassis. The collector of transistor 80 connects over a resistance 86 to positive line 52, and over a resistance 87 to the base of transistor 81, as well as to a resistance 88, the other end of which is connected to chassis. The emitter of transistor 81 also connects to chassis.

The collector of transistor 81 is connected over a resistance 91 with positive bus 52 and over a pair of series-connected resistances 92, 93 to chassis.

The junction point of resistances 92, 93 is connected to the base of control transistor 74. The emitter of transistor 74 is connected to chassis, its collector to the input of impulse generator 36 and to the cathodes of a pair of diodes 94, 95 and further over a resistance 96 to positive bus 52.

The anodes of diodes 94, 95 are each connected over a resistance 97, 98, respectively, with positive bus 52. The anode of diode 95 is further connected to the anode of a diode 99; the cathode of diode 99 connects to the base of transistor 73 and, over a resistance 102, with chassis. The emitter of transistor 73 likewise is connected to chassis; its collector connects to the input of pulse generator 35, and over a resistance 100 to positive bus 52.

FIG. 6 illustrates the detailed construction of pulse generator 35. It is identical with pulse generator 36, which will not be described in detail. Pulse generator 35 is a blocking oscillator, which is a circuit more advantageous than a pulse source using unijunction transistors upon low operating potential.

Impulse generator 35 is controlled by an input transistor Q, corresponding to transistor 73, or 74, respectively, (FIG. 7), whose emitter is connected to chassis (see FIG. 7) and the base of which is connected over a resistance R to positive bus 52.

Impulse generator 35 includes an npn transistor 103, the collector of which connects to positive bus 52, and the base of which is connected to the cathode of a diode 104. The anode of diode 104 is connected over a resistance 105 with positive bus 52 and further over the series connection of a resistance 106, a condenser 107 and a winding 108 of a transformer 109 with the collector of the input transistor Q. Winding 108 has a tap 112, connected to the emitter of transistor 103.

Transformer 109 has an output winding 113, one terminal of which is connected to the cathode of the thyristor to be controlled, and indicated in FIG. 6 as Thyr. The other terminal of winding 113 is connected over a resistance 114 with the control electrode of the thyristor Thyr. A resistance 115 is placed across the control or gate electrode of the thyristor and its cathode.

The input transistor Q is a switch, supplying current to the pulse source 35, or interrupting the current supply. When transistor Q is conductive, pulse source 35 oscillates and provides pulses at the output winding 113, of approximately 5 v. and of a frequency of about 6 kHz. These pulses fire thyristor Thyr, to become conductive.

Operation of the circuit according to FIG. 7 as described so far: Upon connection of main switch 15 and ignition switch 50, a positive potential of, for example, 8 v. will be applied to positive bus 52 (with respect to chassis). The potential is stabilized by Zener diode 54.

Under normal, stop condition, the tap point 42 is so positioned that it is at chassis potential, that is at the side of potentiometer 43. Condenser 63 is discharged over diode 62. Since no current will flow through motor 10, 11, both terminals of measuring resistance 18 are at chassis potential, the junction 56 and with it the base of transistor 78 will have chassis potential and a collector current will flow through the transistor 78, blocking transistor 79, causing transistor 80 to become conductive so that its collector will have a potential which is only slightly less positive than chassis potential. This blocks transistor 81 and the voltage divider formed of resistances 91, 92, 93 applies a positive potential to the base of transistor 74 which will cause transistor 74 to become fully conductive, connecting pulse source (blocking oscillator) 36. Blocking oscillator 36 will apply triggering pulses to thyristor 25; pulse generator 35 will be off, so that thyristor 13 is not supplied with triggering pulses.

If the position of tap point 42 is changed, so that a potential will arise between it and chassis, the input junction 56 will become more positive. As previously described, the rise of this current is delayed by condenser 63. This current causes the potential of the base of transistor 78 to rise slightly, so that this transistor becomes less conductive; transistor 79 begins to become conductive; transistor 80 thus becomes somewhat less conductive, causing its collector potential to become more positive. Rise of the collector potential of transistor 80 is applied over the R-C series circuit 38, 39 to junction 56 and thus to the base of transistor 78, causing the base to become even more positive, so that this transistor will completely block, causing transistor 79 to become fully conductive, blocking transistor 80. Transistor 81 thus will become fully conductive, shunting resistances 92, 93, so that the base of transistor 74 is effectively placed at chassis potential, blocking transistor 74. The collector potential at transistor 74 thus becomes strongly positive, diode 95 blocks and the base of transistor 73 will have positive potential applied thereto. Transistor 73 will become conductive, thus causing blocking oscillator 35 to start oscillating. As soon as blocking oscillator 35 begins to oscillate, transistor 13 is switched ON and motor 10, 11 has current applied thereto. The motor will begin to turn, the potential across the motor rising as the speed of the motor rises as is well known.

The current $i$ in motor 10, 11 causes a potential drop across measuring resistance 18. This potential drop is applied to junction 56, decreasing the potential thereof. At the same time, the feedback condenser 39 discharges, causing the base of transistor 78 to become more negative. Both signals act together, so that the transistor 78 again becomes conductive after a predetermined rise of current $i$. Current through the thyristor 13 is interrupted by gating ON of thyristor 25. These cycles are illustrated in FIGS. 2–4 for various operating conditions in graphic form.

Current $i$ in motor 10 is regulated for an average value, depending upon the position of tap point 42. FIG. 5 illustrates a current distribution, upon starting, with three different set points, namely starting with low current (curve 118), starting with an average current (curve 119) and start with high current (curve 120). The delay in current rise is due to the presence of condenser 63. After start at high current, this current will drop as the motor speed increases, and as its power requirements drop, as seen in FIG. 5 at the portion 121 of curve 120. Motor 10 itself limits its current supply in accordance with the motor load current characteristics. Thyristor 13 is fully conductive. In this mode of operation it is desirable to shunt the thyristor 13 by means of contacts 22, since otherwise the condenser 26 would discharge after some time and it would no longer be possible to turn thyristor 13 off.

The voltage-sensitive semiconductor switch 67 is provided in order to control operation of the shunting relay 22. A pair of transistors, an npn transistor 122 and a pnp transistor 123 are connected in form of a flip-flop circuit. A pair of integrating networks, 126, 127, provide the input stage for the flip-flop circuit. Both integrating networks are connected to the anode of diode 94, and thus to the output potential of the switching amplifier 37. An additional npn transistor 128 is provided, the function of which will be described below.

Transistor 123, of the semiconductor switching circuit 67, has its collector connected through the coil of a relay 129 to chassis. The emitter of transistor 123 connects to positive bus 52. A shunting diode 130 is connected in parallel to the relay coil 129. Relay 129 controls operation of contacts 65 and 66.

The base of transistor 123 is connected over a condenser 133, functioning as an integrating element, back to its collector; further, the base is connected over a resistance 134 to positive bus 52, and over resistances 135, 136 with the collectors of transistors 122, 128, respectively. The collector of transistor 123 is further connected over resistance 137, forming a positive feedback, to the base of transistor 122, and over a resistance 138 to the base of transistor 128. Transistor 128 is of opposite conductivity type to the output transistor 123, as above noted. Its collector-base path is in series with resistances 136 and 138, and in parallel to the collector-base path of output transistor 123.

A resistance 139 interconnects the emitter of transistor 122 with chassis. A parallel network, consisting of a resistance 142 and a condenser 143, interconnects the base of transistor 122 and chassis. The base of transistor 128 is connected with chassis over a resistance 144.

A switch 145 is mechanically connected to the cap 42 of potentiometer 43, as schematically indicated by the dashed line 68. Unless the cap is in the full current position—the maximum current being determined by the setting of resistance 45—the switch 145 will be in the position shown in FIG. 7, that is short circuiting the condenser 146 forming part of the integrating network 127. If the tap 42 is brought in its full load position, switch 145 changes position and connects the emitter of transistor 128 with chassis, thus applying operating potential to transistor 128.

The base of transistor 122 is connected over a resistance 147 with the anodes of a pair of Zener diodes 148, 149. A condenser 152 (e.g. 50 µf.) and a resistance 153 e.g. 5K ohm), in parallel, connected the cathode of Zener diode 148 and chassis. Likewise, a condenser 146 (e.g. 100 µf.) and a resistance 154 (e.g. 30K ohm), in parallel, interconnect the cathode of Zener diode 149 and chassis. The cathode of Zener diode 148 connects over a variable resistance 155 (e.g. maximum value 50K ohm) to the diode 94; the cathode of Zener diode 149 is connected over a variable resistance 156 (e.g. maximum value 5K ohm), and a diode 157 and a condenser 158 (e.g. 0.1 µf.) to the diode 94. The anode of diode 157 is connected to one electrode of condenser 158 and to the cathode of a diode 159. The anode of diode 159 is connected to chassis.

Operation of the voltage-sensitive switch 67: If the switching ratio $m$ is rather high, that is when the switched-on period $T_1$ (see FIG. 2) of thyristor 13 is long with respect to its turn-off time $T_2$, then the transistor 74 is blocked almost continuously. The collector of transistor 74 is thus almost continuously positive. This blocks diode 94 almost continuously, and current can flow from the positive bus 52 over resistances 97 and 155 to condenser 152 and charge condenser 152. With this switching ratio, the charging current will be greater than the discharge current over the resistance 153. Thus, condenser 152 will become charged to a potential which is high enough in order to cause Zener diode 148 to become conductive, thus applying base current to transistor 122, causing transistor 122 to conduct. The base of transistor 123 will then receive a negative potential over resistance 134, causing transistor 123 to conduct. The feedback resistance 137 causes an abrupt switch-over. Zener diode 148, 149 may be replaced by reversely poled rectifier diodes.

When transistor 123 becomes conductive, current will flow through relay 129, which will close the contact 66 of the shunting relay 19, so that thyristor 13 will be shunted by contacts 22 and need not carry current anymore. Simultaneously, upon switching of contact 66, contact 65 of relay 129 will open, thus inserting resistance 59 in the sensing circuit. As above described, resistance 59 compensates for changes in the error signal due to differences in internal resistance between thyristor 13 and the contact resistances of contacts 22.

If the current in motor 10 now exceeds the command value, as determined by the setting of tap 42, the potential at resistance 18 will increase, the lower potential at input junction 56 will decrease the switching ratio $m$ and the switching relationship as seen in FIG. 3 will be obtained. At this time, however, no current will flow through thyristor 13 since the shunting contacts 22 continue to remain closed. Since, however, transistor 74 becomes periodically conductive, as seen in FIG. 3 in the not-hatched time periods, charging current will be applied to condenser 152 only during a period of time, so that the potential on condenser 152 will drop below the breakdown potential of Zener diode 148. Zener diode 148 will block, transistors 122, 123 become non-conductive and the shunting contacts 22 will open due to opening of relay 129. Thyristor 13 becomes conductive, itself carrying the current to motor 10, which current will be limited to the value determined by the position of tap 42.

Interruption of the shunting action of relay 19, that is opening of contacts 22 may be undesirable in many instances, since it is coupled with a decrease in power. If, for example, after a normal starting operation, the vehicle driven by motor 10 has to ascend a grade, so that the motor current exceeds the value determined by the setting of tap 42, shunting contact 22 would open and the vehicle could proceed only very slowly or might even stop. Switch-over contact 145 presents such stopping. In the full-load position of tap 42, the emitter of transistor 128 is connected to chassis and thus operating potential is applied to transistor 128. If transistor 123, at that time, is non-conductive, then the base of transistor 128, just as its emitter, is on chassis potential. Thus, transistor 128 remains non-conductive and does not influence transistor 123. If, however, transistor 123 is conductive transistor 128 will have a positive potential applied to its base, due to the potential drop across relay 129, causing a base current to flow and causing conduction of transistor 128. This causes a potential drop across resistance 134, which potential drop continues to hold transistor 123 conductive, even if the potential across condenser 152 drops.

If the tap 42 is set at full load, the shunting contacts 22 thus will remain closed, even if the current through the motor increases strongly. This feature of the invention has been found very practical in actual operation, since it permits utilization of the full power output of the motor 10.

It may occur that the motor 10, upon starting, must overcome particular obstacles, for example if the vehicle is placed in front of a sill, which must be gone over upon starting. If the circuit is used in a locative pulling railroad cars which were stationary for an appreciable period of time, it may occur that the bearings of the cars have no more lubrication applied thereto and placing the railroad cars in motion requires substantial starting effort in order to overcome static friction.

To provide for initial start-up under such high-load conditions, it is necessary to increase the value of the current through motor 10, 11, above the value which would be permissible from the setting of the potentiometer tap 42 alone. If, in such a case, the tap 42 is set at high power, the motor 10, 11 could not start since it acts practically as a short circuit. The current $i$ in such a case is illustrated in FIG. 4. If the maximum current $I_{max}$ is exceeded, thyristor 13 is switched off. As soon as it decreases below $I_{max}$, thyristor 13 is turned on again. This cycle repeats very rapidly, for example at a frequency of several hundred cycles per second. The eventual frequency depends on the inductivity, and the short circuit current of motor 10. It is this frequency which is sensed, and utilized as a further characteristic to control the shunting contacts 22.

The frequency of turn-on-off control of thyristor 13 also causes the transistor 74 to become alternatingly conductive and non-conductive. Condenser 158 will thus have a potential applied thereto which is pulsating in synchronism with this frequency. Condenser 158 transmits this frequency, which is rectified by rectifiers 157 and 159 to charge condenser 146, over resistance 156, provided that tap point 42 is in full power position and the transfer switch 145 is moved to the full load position (opposite to the position shown in FIG. 7).

The second integrating network 127 is so arranged that the potential on condenser 146 will reach the breakdown potential of Zener diode 149 only when motor 10, 11 is stopped. When the Zener diode 149 then becomes conductive, transistor 122 will receive base current and relay 129 will be switched ON, as above described, thus closing shunting contacts 22. Motor 10 thus can have its full short circuit current applied thereto to provide high starting torque. The frequency of change-over of transistor 74 will then decrease, the potential at condenser 146 will drop and Zener diode 149 will become non-conductive.

If tap point 42 continues in its full-power position, then, as above described, transistor 123 will be maintained conductive over transistor 128, and the shunting contacts 22 remain closed. If, however, tap point 42 is now set to a lower value, then the shunting contacts 22 will remain closed only when the switching ratio $m$ is close to 100%. Otherwise, the shunting contacts 22 will open and the current through motor 10, 11 will be controlled solely by the thyristor 13.

The network above described thus as a plurality of functions: it provides a shunt to the thyristor 13 under these conditions:

(1) The change-over of the switching circuit between ON and OFF connection is so timed that the ON duration with respect to the OFF duration (ratio $m$) is high (FIG. 3); or (2) The change-over of the switching circuit between ON and OFF connection occurs at a rapid rate (FIG. 4) and, further, controller 42 has operated switch 145.

This combination enables safe and reliable operation even under difficult and unusual conditions.

The current need not be controlled by the circuit above described. The present invention is also useful with networks which only provide for limitation of maximum current, and no automatic control of current below the maximum, but merely providing for a "start" and a "run" setting. Optimum results are obtained, however, by providing for smooth variation of change in load current.

What is claimed is:

1. Motor control system to control supply of current from a source to an electric motor (10, 11) having
   a thyristor (13) series connected with the current supply for the motor;
   a switching circuit (37) controlling the ON-OFF state of said thyristor (13);
   a shunt circuit, (19, 22) connected in shunt to said thyristor and shunting said thyristor when in closed state, and being ineffective when in open state;
   means (42, 43) supplying a command signal;
   and means (18) sensing an electrical characteristic of the motor when connected to said current supply and providing a sensed signal;
   characterized by the combination of
   means (56) connected to said command signal and to said sensed signal and developing and error signal ($\Delta i$), said error signal being connected to and controlling said switching circuit (37) to turn said thyristor (13) both ON and OFF, respectively;
   and control means (126, 67) sensing and responsive to the relationship of ON-time to OFF-time of said thyristor during repetitive change-over of said switching circuit between ON and OFF control of said thyristor said control means being, connected to and controlling the state of said shunt circuit in response to sensed change-over of said switching circuit beyond a predetermined limit.

2. System according to claim 1, wherein said control means responsive to repetitive change-over of said switching circuit includes
   an integrating circuit (126) connected to the output of said switching circuit (37) and integrating the output thereof and supplying an output control signal representative of the time said thyristor is controlled, by said switching circuit, to be ON with respect to the time said thyristor is OFF, whereby the switching ratio ($m$; FIGS. 2, 3) will control operation of said shunt circuit.

3. System according to claim 1, including
   compensating circuit means (59) rendered effective by said control means (67) responsive to change-over of said switching circuit to modify the error signal and compensate for difference in power transfer characteristics of said thyristor and said shunt circuit when said shunt circuit is in closed state.

4. System according to claim 3 wherein said means (18) sensing an electrical characteristic includes a circuit supplying a sensing signal representative of motor current and said compensating circuit means are a resistance (59) inserted in said sensing signal circuit modifying the signal applied thereby to compensate for the effect on motor current of the internal resistance of the thyristor, with respect to the resistance of said shunt circuit.

5. System according to claim 4 wherein said shunt circuit includes relay contacts (22) connected across the power path of the thyristor and the compensating circuit means resistance (59 and said relay contacts are both controlled by said control means (67) and switched simultaneously.

6. System according to claim 1, wherein said control means includes input and output transistors (122, 123), said transistors being interconnected by a positive feedback (137).

7. System according to claim 1 including manually settable means supplying said command signal;
   override means (145) connected to said manually settable means (42, 43) and effective at a predetermined position thereof, said override means being connected to supply a control potential to said control means (67, 66) to control operation of said shunt circuit (19, 22) to assume said closed state independently of the rate of time distribution of ON and OFF time of the thyristor and thus of switching ratio.

8. System according to claim 7, wherein said control means includes an output transistor (123) of a first conductivity type (pnp);
   a further transistor (128) having its collector-base path connected in parallel to the collector-base path of said output transistor (123) and being of opposite conductivity type (npn);
   said over-ride circuit means (145) including a switch operated at said predetermined position of said manually settable means (42, 43) applying operating potential to said further transistor (128).

9. System according to claim 1 wherein said control means includes input and output transistors (122, 123), said transistors being interconnected by a positive feedback (137);
   and including a further integrating circuit comprising a condenser (133) connected between the collector and base of the output transistor (123).

10. System according to claim 7
    wherein said control means sensing and responsive to change-over of said switching circuit (37) is responsive to the rate of switching of said circuit and includes means supplying a switching-rate output signal having a value representative of switching rate;
    and means controlling said control means (67) to close control operation of said shunt circuit (19, 22) to assume said closed state when said switching-rate output signal exceeds a predetermined value and only if said override means is also at said predetermined position.

11. System according to claim 10 wherein said frequency responsive means (127) is a second integrating circuit.

12. System according to claim 11 wherein said second integrating circuit (127) is connected to the switching circuit (37) by a high pass filter (158).

13. In an electrically driven vehicle, a source of power;
    a motor;
    a thyristor circuit intermittently supplying current to said motor;
    manually settable means supplying a command signal;
    means comparing an operating parameter of said motor and said command signal and providing an error signal, said error signal being applied to said thyristor circuit to control the rate of ON-OFF switching and time period of current supplied to said motor;
    a shunt relay having contacts in parallel to the power path of said thyristor;
    a control circuit for said shunt relay;
    a sensing network connected to said thyristor circuit responsive to the relationship between the period of current supply and the period of current interruption and supplying a control output signal;
    and a sensing and switching circuit having said control output signal applied thereto and being connected to control said shunt relay in accordance with a sensed predetermined characteristic of said control output signal.

14. In a vehicle of claim 13
    means interconnected with said manually settable means and connected to said sensing and switching circuit to cause said switching circuit to control the operation of said shunt relay additionally upon sensing a predetermined position of said manually settable means.

15. In a vehicle of claim 14, wherein said sensing network includes an integrating network providing a control output potential determined by the ratio of ON-time with respect to OFF time of said thyristor.

16. In a vehicle of claim 14, wherein said sensing network includes an integrating network providing a control output potential determined by the rate of switching of ON-OFF time thereof.

17. In a vehicle of claim 14, including signal modifying means switchable in circuit with said control circuit for said shunt relay simultaneously with operation of said shunt relay to modify application of said control output signal to said sensing and switching circuit when said thyristor is shunted, to thereby compensate for differences between voltage drop, across said thyristor and across said relay contacts.

References Cited
UNITED STATES PATENTS

| | | | |
|---|---|---|---|
| 3,344,332 | 9/1967 | Polries | 318—332 |
| 3,297,930 | 1/1967 | Payne | 318—527 XR |
| 3,260,912 | 7/1966 | Gregory | 318—345 |
| 3,337,786 | 8/1967 | Heyman et al. | 318—345 |
| 3,361,921 | 1/1968 | Montross et al. | 318—341 |

ORIS L. RADER, Primary Examiner

K. L. CROSSON, Assistant Examiner

U.S. Cl. X.R.

318—341, 345